Dec. 7, 1971     M. W. SANDLIN     3,624,927

BEAD COUNTING DEVICE

Filed Jan. 27, 1970     2 Sheets-Sheet 1

INVENTOR
MARGARET WHITEHURST SANDLIN

BY John H. Widdwon

ATTORNEY

Dec. 7, 1971  M. W. SANDLIN  3,624,927
BEAD COUNTING DEVICE
Filed Jan. 27, 1970  2 Sheets-Sheet 2
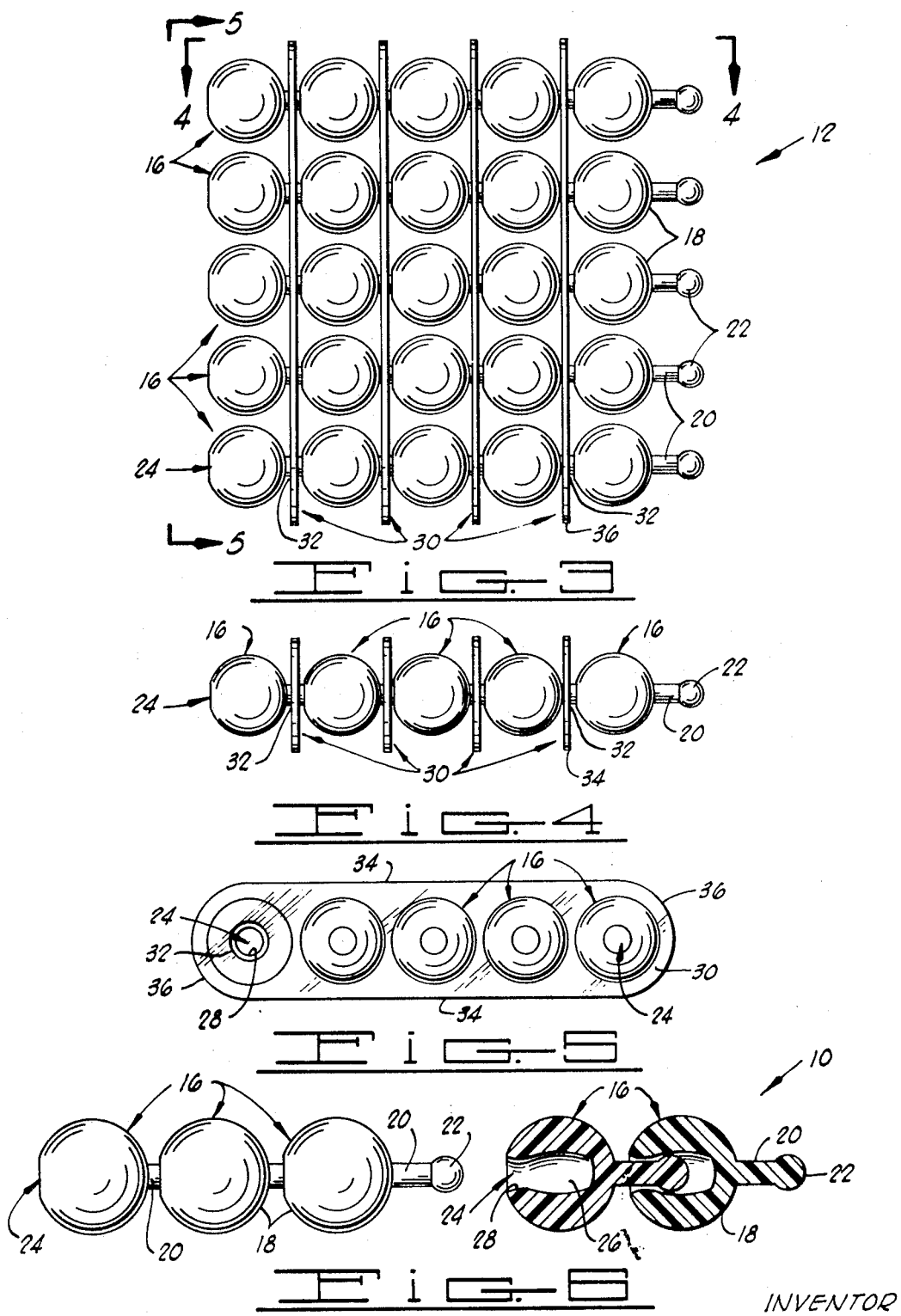
INVENTOR
MARGARET WHITEHURST SANDLIN
BY John H. Widdowson
ATTORNEY

United States Patent Office 3,624,927
Patented Dec. 7, 1971

3,624,927
BEAD COUNTING DEVICE
Margaret Whitehurst Sandlin, 2200 E. Central,
Wichita, Kans. 67214
Filed Jan. 27, 1970, Ser. No. 6,063
Int. Cl. G09b 19/02
U.S. Cl. 35—32      3 Claims

ABSTRACT OF THE DISCLOSURE

This invention is a mathematical multiplication teaching structure including a plurality of planes of interconnectible beads. More particularly, this invention comprises a plurality of beads each having a stem extending therefrom and a cavity therein which functions to join them; the beads are held in a planar relationship by a spacing sheet preferably of thin flat transparent material having apertures therein to receive the stems of the beads.

---

Numerous types of combinational mathematical teaching aids are known to the prior art. However, these devices require the student's imagination to separate the units of the model and visualize their relation in the model. This visualization difficulty is particularly apparent in models that are blocklike having divisions drawn or etched thereon. Additionally, the prior art devices are limited to demonstrating one particular mathematical set by their unit-like nature and not being separable.

In one preferred specific embodiment of this invention, a mathematical multiplication model device is provided which has a set of beads representing a number, a square of the set of beads representing the square of the number, and a cube of the set of beads representing the cube of the number, each set individually connected and supported together. The beads each have a male stem and a female cavity, interlocking with one another and are positioned in the models by thin plate-like separating sheets holding the bead stems. The square of a set of beads has columns of beads and rows of beads each having the number of beads equal to the number of the set and having a separating sheet between each row of beads. The cube of a set of beads has a number of beads equal to the cube of the number represented and is arranged in square layers having sides with a number of beads equal to the number represented and a number of layers is equal to the number represented. The layers of beads in the cube are held by separator members. The beads comprising the model structures of this invention preferably have a different color for each number and its multiples which they represent; so each number and its represented multiples preferably have a color different from that of the other numbers and their represented multiples. The beads are preferably constructed of flexible plastic like material so that they can be easily separated from and rejoined to one another by finger pressure. The separator sheets are preferably transparent thereby permitting one to see into the model and have smooth corner and edge surfaces for safety.

One object of this invention is to provide mathematical multiplication modeling devices which overcome the aforementioned disadvantages of the prior art devices.

Another object of this invention is to provide mathematical multiplication modeling devices which easily allow a student to visualize a representation of mathematical multiplication of ordered sets of numbers by the use of beads.

Still another object of this invention is to provide mathematical multiplication modeling devices which are easy for an instructor to use and are attractive to the students.

Still another object of this invention is to provide mathematical multiplication modeling devices which are easily assembled and economical to manufacture.

Various other objects, advantages, and features of the invention will become apparent to those skilled in the art from the following discussion, taken in conjunction with the accompanying drawings, in which:

FIG. 3 is a plan view of a typical square of beads having the stems disposed longitudinally in a plane perpendicular to the viewer's line of sight;

FIG. 4 is an elevational view taken on line 4—4 of FIG. 3;

FIG. 5 is an elevational view taken on line 5—5 of FIG. 3; and

FIG. 6 is an exploded partially cross-sectional elevational view of a string of beads having two beads removed and shown in cross-section.

Figure 1:
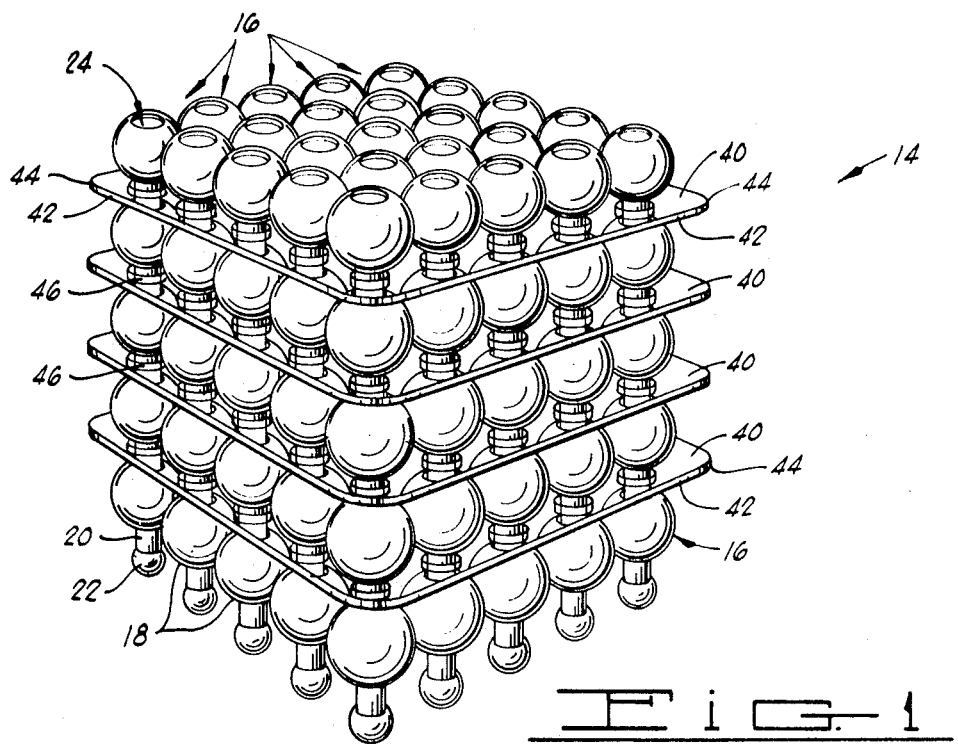
FIG. 1 is a perspective view of a typical cube of beads with the bead stems downwardly disposed.
Figure 2:
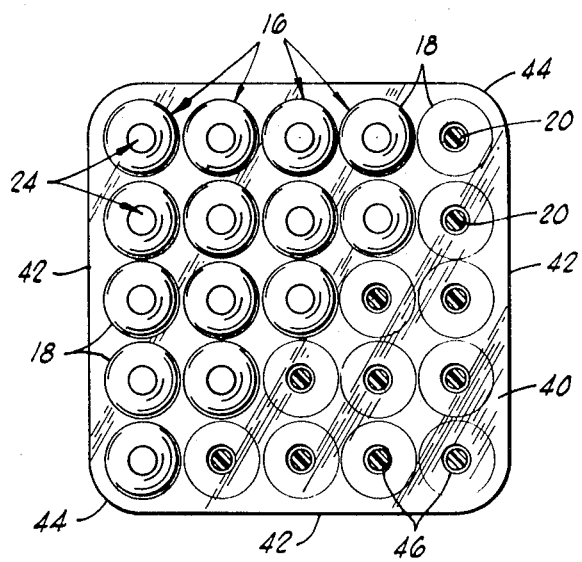
FIG. 2 is a top plan view of the typical cube of beads shown in FIG. 1, with stems downwardly disposed and having a portion of the top layer of beads removed for clarity.

The following is a discussion and description of preferred specific embodiments of the mathematical multiplication model structures of this invention, such being made with reference to the drawings whereupon the same reference numerals are used to indicate the same or similar parts and/or structure. It is to be understood that such discussion and description is not to unduly limit the scope of the invention.

Referring to the drawings in detail and in particular to FIG. 6, a typical number five (5) represented by a set of five (5) beads generally indicated at 10, and FIG. 3, a square of beads representing the typical number represented of FIG. 6, generally indicated at 12, and FIG. 1 a cube of beads generally indicated at 14 representing the typical number represented of FIG. 6.

The individual beads 16 of the models have a generally spherical outer surface 18, a stem 20 extending therefrom, an enlarged end portion 22 thereon and have a somewhat cylindrical stem-receiving cavity 24 therein. The stem 20 extends radially from the bead 16 and is cylindrical in shape. The enlarged end portion 22 is spherical in shape and integral with the stem 20. The stem-receiving cavity 24 has generally cylindrical sidewall indicated at 26, having an internal size sufficient to receive and retain the stem 20 and end portion 22 of another bead. Near the outer portion of the cavity 24, the sidewall 26 has a venturi-like portion 28 of lesser circumferential dimension; this venturi portion 28 acts as a partial occlusion preventing the end portion 22 of the stem 20 to pass from the recipient bead 16 without having force exerted on it. The beads 16 are joined by pressing the stem 20 and end portion 22 of one bead into the stem receiving cavity 24 of another bead, passing the venturi portion 28 and into the larger sidewall portion 26. The beads 16 are preferably constructed of a flexible plastic-like material which allows them to be joined and separated with finger pressure.

When the beads 16 are joined in a line, they can be used by a person to represent a number, any number. A number is represented by a set of beads; the number of beads 16 in the set is equal to the represented number; FIG. 6 shows a typical set of beads at 10, with two beads 16 removed, representing the number five (5).

A square of a number is represented by a set of beads, the number of beads 16 in the set is preferably equal to the square of the number. The beads 16 are joined in rows and columns of equal number and supported in one plane. The columns of beads 16 are interlocked with one another, as described above, and held by their stems in rows by separating sheets 30. The separating sheets 30 have preferably an elongated flat rectangular platelike shape with holes, indicated at 32, therein to receive the stem 20 of the adjacent bead in the column and hold them. The edges 34 and end portions 36 of the separating sheets 30 extending radially over the outer surface 18 of the beads 16. The separating sheets 30 hold the beads 16 with their outer surfaces 18 nearly touching. This provides a compact and coherent structure making it easier to handle when the device contains large numbers of beads 16.

A cube of a number is represented by a set of beads; the number of beads 16 is equal to the cube of the number. The beads 16 are positioned in generally a cube shape in layers, interlocked in columns by means of their stem 20 and stem-receiving cavity 24 and held in layers by separating sheets 40 fitted around the stems 20 of the beads 16 as described above. The separating sheets 40 are preferably of a flat, thin plate-like form having a generally square planform with smooth edge 42, rounded corners 44 and with a plurality of uniformly spaced holes 46 therethrough. The holes 46 are preferably positioned to hold the beads 16 with their outer surfaces 18 nearly touching and are sized sufficient to receive the stem 20 and end portion 22 of the beads 16. The separating sheets 40 are preferably somewhat clear so both teacher and student using the structure can see into it and clarify the visualization of the number it is representing.

In the manufacture of the mathematical multiplication modeling device of this invention, it is obvious the beads 16 are preferably constructed of a somewhat flexible plastic-like material which can be colored, and the separating sheets 30 and 40 are preferably constructed of a flat, thin, transparent plastic material.

In the use of the mathematical multiplication modeling device of this invention, it is seen that same provides a means of visually representing a number, its square and its cube by a string of beads 10, a square of beads 12 and a cube of beads 14. The quantity of beads 16 is equivalent to the number, one for one or in multiples thereof, however, the quantity of beads may be modified and the device demonstrated by removal of the beads 16.

As will be apparent from the foregoing description of the applicant's mathematical multiplication model device, relatively inexpensive means have been provided to aid in the teaching of mathematical multiplication by visual coordination of the number of polynomial multiples thereof. The device is economical to manufacture, simple to use, attractive in appearance and can be used to represent a variety of numbers and polynomial multiples thereof.

While the invention has been described in conjunction with preferred specific embodiments thereof, it will be understood that this description is intended to illustrate and not limit the scope of the invention, which is defined by the following claims.

I claim:
1. A mathematical multiplication model structure comprising:
   (a) interchangeable and interconnectible beads in a plurality of planes of same with a plurality of said beads in each plane, each of said beads having a male stem portion projecting therefrom and an oppositely disposed female cavity therein;
   (b) said beads being connected with the stems of the beads in one plane extending in connecting relation into the cavities of said beads in an adjacent plane; and
   (c) a relatively thin, flat unitary and one-piece spacing and mounting sheet between adjacent planes of beads and having therethrough spaced apertures, said stems of said beads in one plane passing through said apertures in said sheet.

2. A model structure as described in claim 1, wherein said beads in each of said planes are in a square pattern, and said sheet is square, transparent and of plastic material.

3. A model structure as described in claim 1, wherein said beads in total form a cube pattern, and said sheet is square, transparent and of plastic material.

References Cited

UNITED STATES PATENTS

| | | | |
|---|---|---|---|
| 2,714,269 | 8/1955 | Charles | 35—18 A UX |
| 2,867,052 | 1/1959 | Feibelman | 63—2 UX |

FOREIGN PATENTS

| | | | |
|---|---|---|---|
| 17,890 | 1913 | Great Britain | 35—33 |
| 597,762 | 2/1948 | Great Britain | 35—18 A |

WILLIAM H. GRIEB, Primary Examiner